(No Model.) 3 Sheets—Sheet 1.

W. LOUDEN.
HAY CARRIER ELEVATING PULLEY.

No. 434,544. Patented Aug. 19, 1890.

Witnesses:
R. B. Louden
F. H. Higby

Inventor:
William Louden

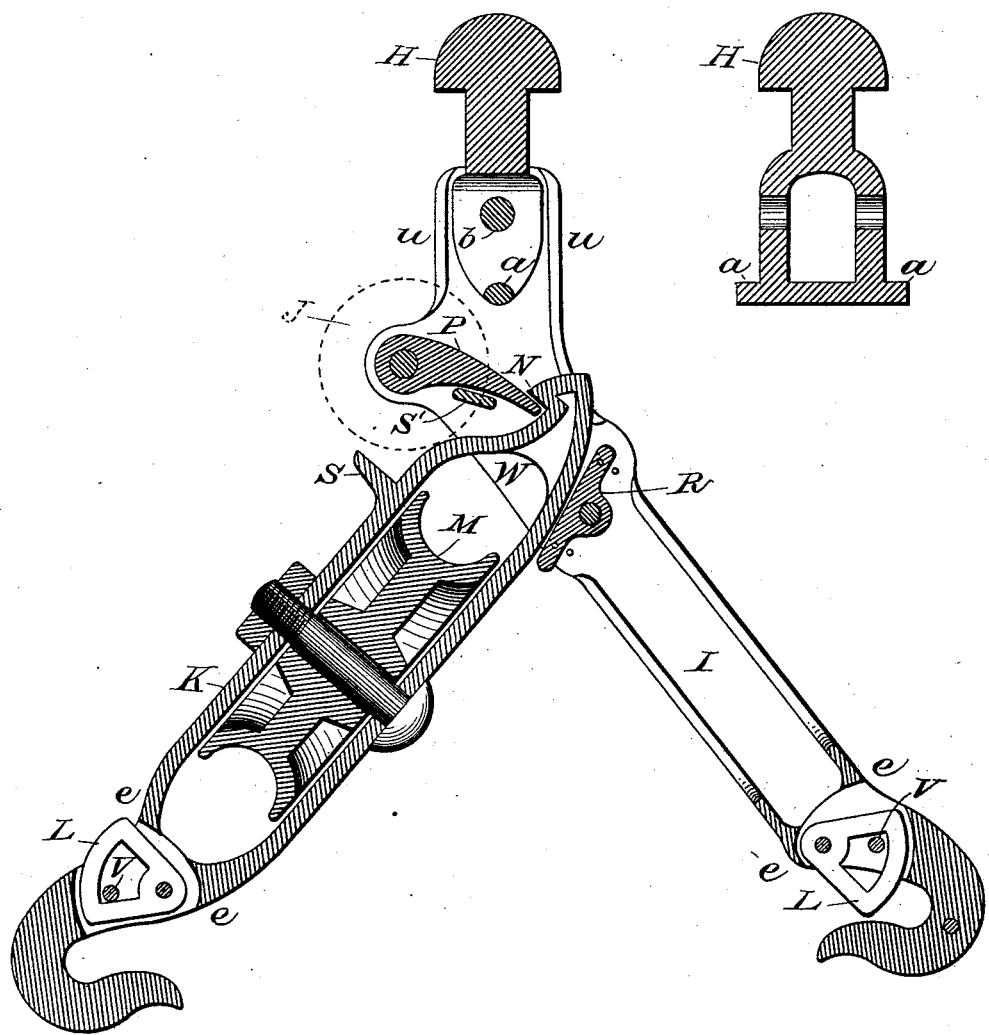

(No Model.) 3 Sheets—Sheet 3.

W. LOUDEN.
HAY CARRIER ELEVATING PULLEY.

No. 434,544. Patented Aug. 19, 1890.

Witnesses:
R. B. Louden,
F. H. Wigby

Inventor:
William Louden

UNITED STATES PATENT OFFICE.

WILLIAM LOUDEN, OF FAIRFIELD, IOWA.

HAY-CARRIER ELEVATING-PULLEY.

SPECIFICATION forming part of Letters Patent No. 434,544, dated August 19, 1890.

Application filed April 25, 1890. Serial No. 349,555. (No model.)

*To all whom it may concern:*

Be it known that I, WILLIAM LOUDEN, a citizen of the United States, residing at Fairfield, in the county of Jefferson and State of Iowa, have invented new and useful Hay-Carrier Pulleys, of which the following is a specification.

My invention relates to the elevating and carrying pulleys of hay-carriers wherein two or more pulleys are used together, and the object of my improvements are, first, to provide these pulleys with interlocking devices and to arrange them so that when locked together they will register and lock in the carrier in the same way as when only one pulley is used; second, to provide the hooks of the pulleys with self-operating stops to prevent the load-holding device from prematurely unhooking, and, third, to arrange the pulleys in detail so they will operate with any kind of dead-lock hay-carrier.

As hay-carriers are generally operated, one elevating-pulley only is used; but in many cases it is necessary to attach the elevating-tackle to the load at separate points. This is particularly the case in using carriers with hay-slings which have to be connected to the elevating-tackle at each end; and the object of my invention is to provide the ordinary hay-carriers in use with elevating-pulleys which will first hitch to the ends of the sling and roll the hay up in a compact bundle; second, lock together and elevate the sling-load to the carrier, and, third, lock in the carrier the same as a single elevating-pulley does and carry the sling-load over the mow without the necessity of using a brake on the rope to prevent the loaded sling from unrolling and to hold it from dropping down from the carrier. I attain these objects by the mechanism illustrated in the accompanying drawings, in which—

Figure 1:
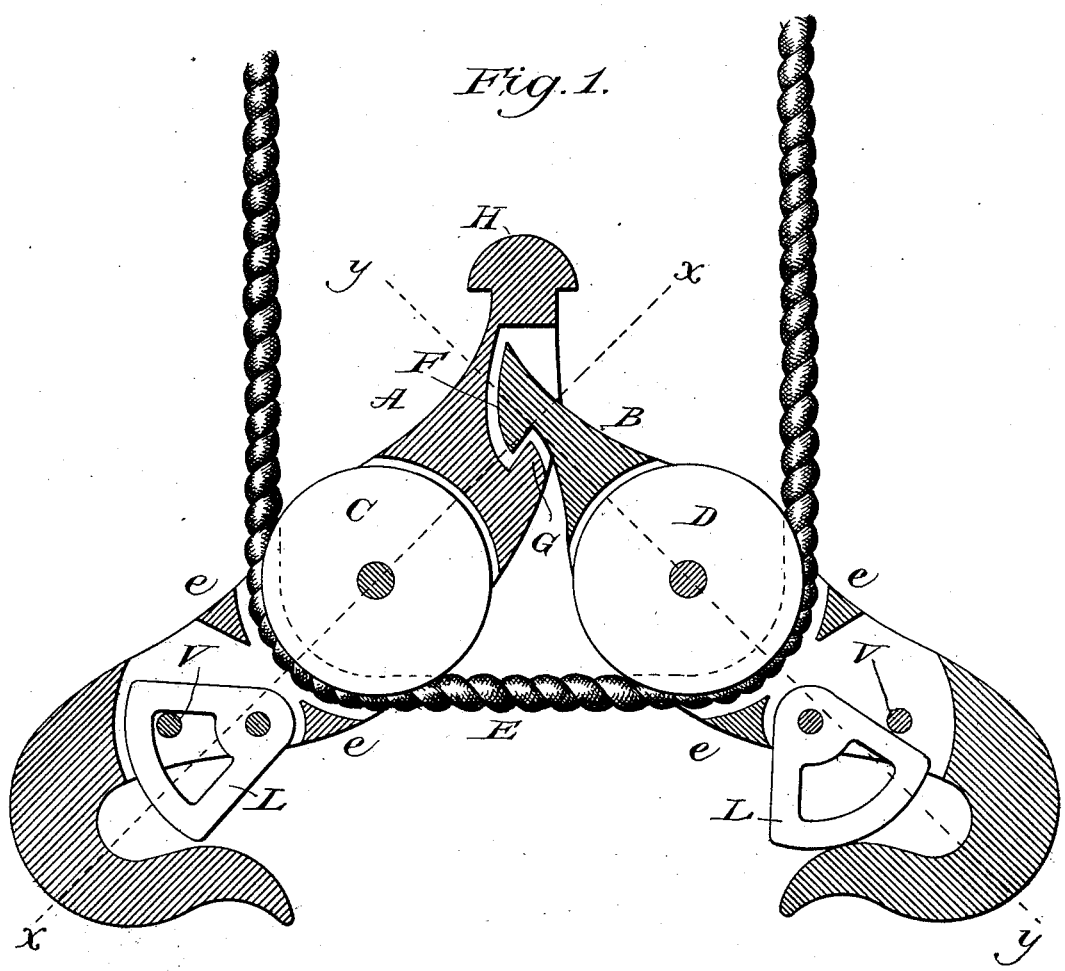
Figure 4:
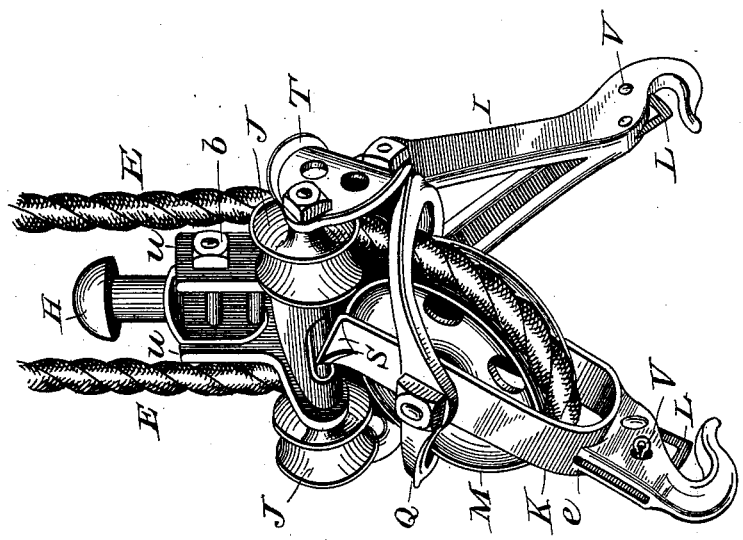
Figure 3:
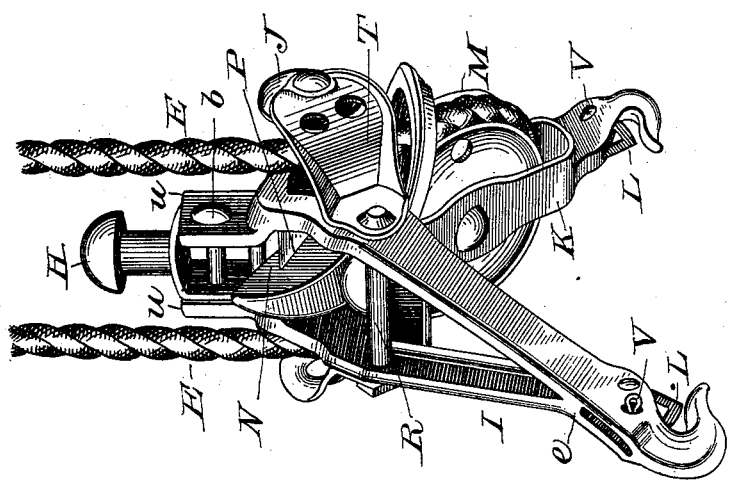

Figure 1 is a vertical section of the pulleys with sheaves set vertically and arranged to operate in the same plane; Fig. 2, a vertical section of the pulleys with sheaves arranged to operate at right angles to each other, (the guard of the single pulley not being shown,) the one having two sheaves set vertically and the other one sheave set horizontally. Fig. 3 is a front perspective of the right-angle pulleys locked together. Fig. 4 is a rear perspective of the right-angle pulleys locked together. Fig. 5 is a cross-section of the registering-head H.

In its simplest form my invention consists of two pulley-frames A and B, carrying sheaves C and D and provided with an elevating-rope E, which passes through both pulleys, and is connected in the ordinary way to the carrier. One of the pulley-frames is provided with a hook F and the other with a shoulder or catch G, which is fitted in a recess in the body of the pulley-frame. When the pulleys are drawn together and necessarily stand at an angle to each other and to the carrier with the rope E, the hook F will catch over the shoulder G and lock the pulleys together. The pulleys will now necessarily stand at an angle of from twenty-five to forty-five degrees, as shown by the dotted lines X X and Y Y. One of the pulley-frames (preferably A) is provided with a head H to register and lock in the carrier in the usual manner.

To overcome the angle of the pulley to which the head H is attached, I set it at a corresponding angle to the pulley, so that while the pulleys are locked together the head H will be held in an upright position and will register freely in the carrier. All that is necessary to adapt the pulleys to work with any kind of a dead-lock carrier is to form the head H to fit the lock mechanism of the carrier.

In operation the pulleys are separated and attached to the ends of the sling. Power being applied to the rope E in the usual way, the pulleys are drawn together and locked to each other. The application of power being continued, the pulleys are then elevated together until the head H registers in the carrier. It is necessary, however, that the recess in the body of the pulley-frame in which the catch G is fitted be formed below and entirely independent of the registering-head H, so that the head may be made in any suitable form or shape to fit the lock mechanism of the carrier without being hampered by the hook F or catch G.

A preferable way of constructing these pulleys is shown in Figs. 2, 3, and 4. The pulley-frame I is fitted with two sheaves J J, set vertically, and an open space W is left in the pulley-frame between the sheaves. The pulley-frame K is provided with a sheave M, set horizontally, and is fitted with a hook N at or near its upper end. The elevating-rope E is passed under one of the sheaves J, then around the sheave M, and then up under the other sheave J. A catch P is pivoted in the pulley-frame I, and a guide-plate R is also fitted in it. The pulleys being drawn together by power applied to the rope E, as already explained, the point of the pulley-frame K will be drawn into the open space W in the pulley-frame I, and, being guided to the position shown in Figs. 2 and 3 by the guide R, the pivoted catch P will drop down behind the hook N and hold the pulleys securely locked together. The guard Q and the stop S on the pulley-frame K prevent it from being drawn too far into the recess in the pulley-frame I and wedging fast. The guard Q is set obliquely on the pulley-frame K, so that the part on the lower side will form a stop, striking against the pulley-frame I, while the part on the upper side will not interfere with the sheaves J J. The guide R can be set at any desired angle to suit different angles of the pulleys. The pivoted catch P is prevented from dropping down too far by means of the stop S', formed on the pulley-frame I. This form of the pulleys is better adapted for them to work at varying angles than that shown in Fig. 1.

In order to adapt my improvement to different kinds of carriers, I make the registering-head H detachable, so that any form or style of head may be fitted between the upper parts u u of the pulley-frame I to suit the carrier. The parts u u may be fitted with flanges, which serve to strengthen them and also to help hold the head H in its place. The lower part of the head H is fitted with projecting pins or points a a, as shown in Figs. 2 and 5, and these points engage recesses in the parts u u of the pulley-frame I, and a bolt b, passing through them and the head H, holds it securely in its place. The sheaves J J are protected by guards T T, bolted to pulley-frame I, as shown in Figs. 3 and 4.

The hooks of the pulleys are provided with safety-stops L L, made in the form of a quadrant. They are pivoted at their inner ends in recesses formed in the pulley-frames just above the openings of the hooks, and are so arranged that they can be pushed up within these recesses and leave the hooks entirely clear for the admission of the rings or links of the sling, as shown in the hook of pulley-frame K in Fig. 2. The hooks being on the under sides of the pulleys, the stops will drop of their own gravity and close the openings and prevent the connecting rings or links of the sling from prematurely unhooking. To unhook the sling, the stop is pushed up, as shown in the hook of the pulley-frame in Fig. 2.

Keys or pins V V, passing through holes in the shanks of the hooks, are used to regulate the movement of the stops. They are generally passed through the openings of the stops formed in their centers; but to close the hook permanently the pin or key is placed above and on the outside of it, as shown in the hook of pulley-frame B. The shoulders e e e e at the top of the recesses in the pulley-shanks may also be utilized to regulate the movement of the stops. I do not, however, limit myself to the use of gravity alone to operate the stops. Springs or any other suitable means may be used. Neither do I limit myself in my basic claims to any precise construction of the pulleys.

What I claim as my invention, and desire to secure by Letters Patent, is—

1. In hay-carriers, the elevating-pulleys adapted to lock together by means of a hook formed on the frame of one of them and engaging a pivoted catch fitted in the frame of the other, the latter pulley being also provided with a registering head to engage and operate the lock mechanism of the carrier, substantially as shown and described.

2. In hay-carriers, the pulley-frames adapted to lock together by means of the hooked end of one of them entering a recess in the body of the other pulley-frame and engaging a suitable catch, the recess being formed below and independent of the registering-head H, as and for the purpose set forth.

3. In hay-carriers, the combination of the pulley-frame I, provided with two sheaves J J, set in a vertical position, and the pulley-frame K, having a sheave M set horizontally, the pulley-frame I being fitted with a head H and provided with a recess or opening W, with a suitable catch fitted therein, and the pulley-frame K provided with a hook N at or near its upper end and adapted to enter the recess or opening W of the pulley-frame I and engage the catch fitted therein, so as to lock the pulleys together, substantially as and for the purpose set forth.

4. The combination of the pulley-frames I and K, having sheaves, substantially as described, the pulley-frame I being provided with a head H and recess or opening W and fitted with a guide R and pivoted catch P, and the pulley-frame K being provided with a hook N, adapted to enter the recess W and engage the catch P, substantially as shown and described.

5. The combination of the pulley-frames adapted to lock together, one of the pulley-frames being provided with a head H, detachably fitted between the flanged parts u u of the pulley-frame, substantially as described.

6. The combination of the pulley-frames adapted to lock together, one of the pulley-frames being provided with a detachable head H, and the lower part of the head being fitted with projecting pins or points a a, substantially as and for the purpose set forth.

7. The combination of the pulley-frames adapted to lock together by means of a hook N being formed on one of them and a catch P, pivoted in the frame of the other pulley, it being also fitted with the head H and stop S', substantially as shown.

8. The combination of the pulley-frames adapted to lock together by means of the hooked point of the pulley-frame K entering a recess or opening in the pulley-frame I and engaging a suitable catch fitted therein, the pulley-frame I being provided with a head H and a guide R, the guide R being adapted to be set at different angles, substantially as shown.

9. In hay-carriers, the pulley-frames fitted with quadrant-shaped stops set in recesses formed in the shank of the pulley-frame so as to automatically close the hook, substantially as and for the purpose set forth.

10. In hay-carriers, the pulley-frames provided with hooks having self-closing quadrant-shaped stops L, being open in the center, in combination with pins or keys V for regulating the movement of the stops, substantially as shown and described.

11. The pulley-frames adapted to lock together, the pulley-frame I being provided with a head H and recess W, and the pulley-frame K being adapted to enter the recess W, and being provided with the stop S, substantially as shown, and for the purpose set forth.

12. The pulley-frames adapted to lock together, the pulley-frame I being provided with a head H and recess W, and the pulley-frame K being adapted to enter the recess W, and being provided with the guard Q, set obliquely, substantially as shown and described.

13. The combination of the pulley-frames adapted to lock together, the pulley-frame I being provided with a head H and sheaves J J, set in a vertical position, and the guards T T, substantially as shown, and for the purpose set forth.

WILLIAM LOUDEN.

Witnesses:
R. B. LOUDEN,
F. H. HIGBY.